United States Patent Office 3,453,311
Patented July 1, 1969

3,453,311
ARYL N-(ARYL)-ALKANOIMIDATES
George A. Miller, Glenside, Pa., assignor to Rohm & Haas Company, Philadelphia, Pa., a corporation of Delaware
No Drawing. Filed Jan. 20, 1966, Ser. No. 521,821
Int. Cl. C07c 119/18; A01n 9/20
U.S. Cl. 260—453
10 Claims

ABSTRACT OF THE DISCLOSURE

This invention is directed to aryl N - (aryl)-alkanoimidates of the formula

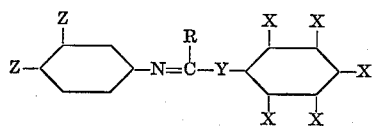

wherein:

R is alkyl of 1 to 6 carbon atoms,
Z is methyl or chloro,
Y is oxygen or sulfur, and
X is either hydrogen, alkyl of 1 to 5 carbon atoms, alkoxy of 1 to 5 carbon atoms, chloro or nitro, in which any two or more members represented by X may be the same or different.

These compounds and agricultural compositions thereof have exhibited outstanding herbicidal activity. They are particularly valuable when utilized as selective herbicides, that is, they have the ability to control numerous weeds which grow among agronomic crops without causing undue injury to such crops.

---

This invention relates to novel aryl N - (aryl)-alkanoimidates. This invention also deals with herbicidal compositions containing these aryl N - (aryl) - alkanoimidates and their use in weed control.

Because of the constantly increasing shortage of food in many areas of the world, industry and agriculture are continually striving for better methods of crop production. One of the major problems faced by agriculture throughout all times has been the growth of weeds along with the economic crop. Weeds not only hinder or even prevent the crop from growing, but at times they make harvesting the crop difficult or even impossible.

The chemical industry is always seeking to discover compounds which will kill the undesired plant growth and alleviate the problems caused by the various weeds that proliferate among the economic crops. The characteristics required for a successful herbicide make the discovery of such compounds extremely unpredictable. Therefore, a great deal of experimentation and research is necessitated. A satisfactory herbicide must be effective at economical rates of application and it must not damage the soil or the crops being grown therein. In many instances, the biological characteristics of the economic crop and the weeds sought to be destroyed are very similar. When this situation arises, as is most often the case, it is very difficult to find a compound that will kill the weed and not harm the crop. The compounds of this invention have these sought-after qualities and, therefore, provide a significant advance in the science of weed control.

Other than the imidates disclosed in German Patent No. 1,084,078, there is no teaching in the prior art with regard to imidates as possessing herbicidal or fungicidal properties. The compounds of this invention are easily distinguished from those of the above-cited German patent. There are no phenyl groups present in the compounds disclosed in said German patent in contradistinction to the novel phenyl containing compounds presently disclosed. An article by Roger and Neilson, "The Chemistry of Imidates" in Chemical Review, 61, pp. 179 to 203 (1961), provides a very thorough review of the literature relating to imidates and their chemistry. U.S. Patents Nos. 3,084,192, 3,119,831 and 3,189,649, disclose the use of phenyl substituted amidines as herbicidally effective compounds. Said amidines are, of course, easily distinguished from the imidates of the present invention.

The compounds of this invention may be represented by the formula

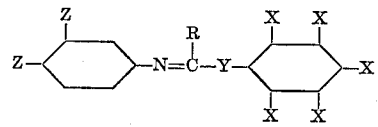

wherein:

R is alkyl of 1 to 6 carbon atoms,
Z is methyl or chloro,
Y is oxygen or sulfur and
X is either hydrogen, alkyl of 1 to 5 carbon atoms, alkoxy of 1 to 5 carbon atoms, chloro or nitro in which any two or more members represented by X may be the same or different.

Typically, R represents methyl, ethyl, propyl, isopropyl, butyl, tert-butyl, 2-methylbutyl, sec-pentyl or 1,1-dimethylbutyl.

Typically, X represents hydrogen, methyl, ethyl, propyl, isopropyl, butyl, pentyl, methoxy, ethoxy, propoxy, butoxy, pentoxy, chloro or nitro.

Typical imidates of this invention are the following:

phenyl N-(3,4-dichlorophenyl)propionimidate,
4-methoxyphenyl N-(3,4-dichlorophenyl) propionimidate,
p-methylphenyl N-(3,4-dichlorophenyl) propionimidate,
2,6-diethylphenyl N-(3,4-dichlorophenyl) propionimidate,
5-propylphenyl N-(3,4-dichlorophenyl) propionimidate,
2,6-dichloro-4-nitrophenyl N-(3,4-dichlorophenyl)-propionimidate,
2,4,5-trichlorophenyl N-(3,4-dichlorophenyl) propionimidate,
phenyl N-(3,4-dimethylphenyl)propionimidate,
phenyl N-(3,4-dichlorophenyl)isobutyrimidate,
p-methoxyphenyl N-(3,4-dichlorophenyl) isobutyrimidate,
2,4-dichlorophenyl N-(3,4-dichlorophenyl) isobutyrimidate,
2,6-dichlorophenyl N-(3,4-dichlorophenyl) isobutyrimidate,
2-methyl-4-chlorophenyl N-(3,4-dichlorophenyl) isobutyrimidate,
pentachlorophenyl N-(3,4-dichlorophenyl) isobutyrimidate,
2,4-propylphenyl N-(3,4-dichlorophenyl) isobutyrimidate,
5-ethoxyphenyl N-(3,4-dichlorophenyl) isobutyrimidate,
3,4-dinitrophenyl N-(3,4-dichlorophenyl) isobutyrimidate,
4-nitro-2-chlorophenyl N-(3,4-dichlorophenyl) isobutyrimidate,
phenyl N-(3,4-dichlorophenyl)thioisobutyrimidate,
phenyl N-(3,4-dichlorophenyl)trimethylacetimidate, phenyl N-(3-chloro-4-methylphenyl)trimethyl-
  acetimidate,
phenyl N-(3-chloro-4-methylphenyl)-α-methyl-
  valerimidate,
phenyl N-(4-chloro-3-methylphenyl)-α-methyl-
  valerimidate,
p-tolyl N-(3,4-dichlorophenyl)-α-methylvalerimidate,
2,6-dichloro-4-methylphenyl N-(3,4-dichlorophenyl)-
  α-methylvalerimidate,
3-nitro-2-ethylphenyl N-(3,4-dichlorophenyl)-α-
  methylvalerimidate,
6-ethoxyphenyl N-(3,4-dichlorophenyl)-α-methyl-
  valerimidate,
3,4-dichlorophenyl N-(3,4-dichlorophenyl)-α-
  methylvalerimidate,
3,4-dichloro-2-propoxyphenyl N-(3,4-dichloro-
  phenyl)-α-methylvalerimidate and
phenyl N-(3,4-dichlorophenyl)-α,α-dimethyl-
  valerimidate.

The compounds, phenyl N-(3,4-dichlorophenyl)propionimidate, 4-methoxyphenyl N-(3,4-dichlorophenyl) propionimidate, phenyl N-(3,4-dichlorophenyl)isobutyrimidate, p-methoxyphenol N-(3,4-dichlorophenyl)isobutyrimidate and p-tolyl N-(3,4-dichlorophenyl)-α-methylvalerimidate, are particularly effective as herbicides.

The compounds of this invention may be prepared by methods well known to one skilled in the art. A preferred method of preparation involves reacting phosphorus pentachloride with a methyl or chloro-substituted anilide, such as 3,4-dichloropropionanilide, 3-chloro-4-methylpropionanilide, 4-chloro-3-methylpropionanilide or 3,4-dimethylpropionanilide. This reaction is carried out with cooling in the presence of an inert organic solvent, preferably an aromatic solvent, such as benzene, toluene or xylene. During the reaction, hydrogen chloride is evolved and there is formed phosphorus oxychloride which is removed under vacuum. The resulting product is diluted with an inert organic solvent, preferably the same solvent or solvents used in the preceding reaction and reacted with a metal or tert-amine phenoxide, preferably an alkali metal phenoxide.

The substituted anilides used in the preparation of the compounds of this invention may be prepared by methods well known to one skilled in the art. One such process, as disclosed in British Patent No. 903,766, comprises taking up 3,4-dichloroaniline in a volatile, inert, organic solvent and reacting it with the appropriate carboxylic acid or its acid anhydride or its acid halide. In the last case, an alkaline reagent is supplied to take up the hydrogen halide split out. If the carboxylic acid is reacted, the mixture is heated under reflux with removal of water carried over by the azeotropic liquid.

The compounds of this invention may be more fully understood from the following examples which are offered by way of illustration and not way of limitation.

PREPARATION OF INTERMEDIATE N-(3,4-DICHLOROPHENYL)PROPIONIMIDOYL CHLORIDE

A 3 liter, 3-necked flask equipped with a mechanical stirrer, thermometer and condenser with drying tube was flame dried and flushed with dry nitrogen. Into this flask was then placed 104 g. (0.5 mole) of phosphorus pentachloride and 1 liter of dry benzene. The mixture was warmed to 45° C. in order to form a clear solution. The solution was then cooled to 20° C. and 109 g. (0.5 mole) of 3,4-dichloropropionanilide (94.5% pure) was added quickly through a powder funnel. The reaction was stirred and kept at 20° C. by cooling in an ice bath for 4 hours, during which time hydrogen chloride was copiously evolved. The reaction was completed by allowing it to stir overnight at room temperature. After this time, the reaction mixture was filtered under nitrogen to remove a small amount of insoluble material and the filtrate was concentrated at the steam bath under 20 mm. vacuum. Two 100-ml. portions of benzene was added to the concentrate and evaporated to aid in the removal of traces of phosphorus oxychloride. Finally, the concentrate was placed under 1 mm. vacuum on a rotary evaporator at steam bath temperature for 0.5 hour. The weight of dark crude imidoyl chloride obtained in this way was 113.2 g. (96% theoretical).

EXAMPLE 1

Preparation of phenyl N-3,4-dichlorophenyl propionimidate

An ethanolic solution of sodium phenoxide was prepared by dissolving 4.6 g. (0.2 g. atom) of sodium in 200 ml. of anhydrous ethanol and then adding 18.8 g. (0.2 mole) of distilled phenol. To the resulting solution was slowly added 47.2 g. (0.2 mole) of N-(3,4-dichlorophenyl)propionimidoyl chloride diluted with 50 ml. of dry benzene at 20° C. The reaction was stirred for 3 hours at room temperature and then the solvent was removed by distillation under vacuum. The resulting residue was taken up in ether, filtered to remove sodium chloride and evaporated once again to leave a dark concentrate, 44.0 g. (75% theoretical). The concentrate was distilled under hi-vacuum to give 33.4 g. of product, 98% pure by gas chromatography.

Examples 2 through 13, as shown in Table I, were prepared in a manner similar to that of Example 1. The specific embodiments of Examples 1 through 13, along with the analysis of each compound and its theoretical analysis are detailed in said table.

TABLE I

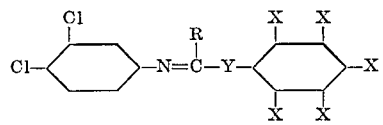

| Example No. | R | Y | X (where X is other than H) | Physical properties [1] | Analysis [2] (percent) | | | | |
|---|---|---|---|---|---|---|---|---|---|
| | | | | | C | H | N | Cl | S |
| 1 | CH$_2$CH$_3$ | O | None | B.P. 151-6° C. (0.5 mm.) | 59.98(61.3) | 4.42(4.42) | 4.71(4.76) | 24.33(24.1) | |
| 2 | CH$_2$CH$_3$ | O | OCH$_3$-4 | B.P. 186° C. (0.05 mm.) | 59.50(59.3) | 4.66(4.67) | 4.18(4.32) | 20.53(21.85) | |
| 3 | CH$_2$CH$_3$ | O | Cl$_3$-2,4,5 | B.P. 178° C. (0.01 mm.) | 45.71(45.35) | 2.68(2.52) | 3.53(3.52) | 44.34(44.60) | |
| 4 | CH$_2$CH$_3$ | O | Cl$_2$-2,6-NO$_2$-4 | M.P. 101° C. | 44.10(44.2) | 2.56(2.45) | 6.84(6.87) | 35.00(34.75) | |
| 5 | CH—C$_3$H$_7$ \| CH$_3$ | O | CH$_3$-4 | Oil | 64.84(65.14) | 6.15(6.05) | 3.95(4.0) | 20.40(20.25) | |
| 6 | CH—C$_3$H$_7$ \| CH$_3$ | O | Cl$_2$-3,4 | Oil | 53.73(53.4) | 4.45(4.23) | 3.44(3.46) | 34.61(35.0) | |
| 7 | CH(CH$_3$)$_2$ | O | OCH$_3$-4 | B.P. 150° C. (0.005 mm.) | 60.21(60.4) | 5.22(5.07) | 3.99(4.14) | 21.29(21.0) | |
| 8 | CH(CH$_3$)$_2$ | O | Cl$_2$-2,6 | M.P. 89-90° C. | 51.40(51.0) | 3.47(3.47) | 3.56(3.72) | 37.63(37.6) | |
| 9 | CH(CH$_3$)$_2$ | O | Cl$_2$-2,4 | Oil | | | | | |
| 10 | CH(CH$_3$)$_2$ | O | CH$_3$-2-Cl-4 | B.P. 147° C. (0.005 mm.) | | | | | |
| 11 | CH(CH$_3$)$_2$ | S | None | B.P. 125.7° C. (0.01 mm.) | 59.26(59.35) | 4.75(4.66) | 4.24(4.32) | 22.01(21.85) | 9.60(9.88) |
| 12 | CH(CH$_3$)$_2$ | O | do | B.P. 147° C. (0.5 mm.) | 22.98(23.0) | 5.15(4.98) | 4.57(4.55) | 22.98(23.0) | |
| 13 | CH(CH$_3$)$_2$ | O | Cl$_5$ | M.P. 148°-50 C. | 40.05(40.1) | 2.34(2.08) | 2.96(2.92) | 51.79(51.7) | |

[1] B.P.=Boiling point at indicated mm. (Hg) pressure. M.P.=Melting point.
[2] The number within the parentheses represents the theoretical value, as calculated, using the empirical formula of each compound.

The compounds of this invention, either alone or in admixture, exhibit excellent post-emergence herbicidal activity on a variety of monocotyledonous and dicotyledonous weeds while having very little phytotoxic effect on economically important crops, such as rice or tomatoes. When used as herbicides, the imidates of this invention may be formulated in several ways, such as wettable powders, emulsion concentrates, dusts or granular powders, and applied to the plants to be treated in any manner suitable for such application. The more commonly used methods of application include the use of an air stream, an aqueous spray or a granular applicator. Those compounds of the present invention which are normally in liquid form are particularly effective as selective herbicides when applied as undiluted liquids to the plants to be treated, as disclosed in U.S. patent application Ser. No. 521,822, filed on even date herewith.

Herbicidal compositions are prepared from the compounds of this invention by incorporating them in an agronomically acceptable carrier, with the addition of surfactants or other suitable additives, if desired, and admixing to give uniformly formulated mixtures. By "agronomically acceptable carrier" is meant any substance which can be used to dissolve, dispense or diffuse the chemical to be used therein without impairing the effectiveness of the toxic agent and which does no permanent damage to such environment as soil, equipment and agronomic crops.

Emulsion concentrate formulations may be made by dissolving the compounds of this invention in an agronomically acceptable organic solvent and adding a solvent-soluble emulsifying agent. Suitable solvents for these imidates are found in the hydrocarbon, chlorinated hydrocarbon, ketone, ester, alcohol and amide classes of organic solvents, such as xylene, naphthas, ethylene dichloride, cyclohexanone, methyl ethyl ketone, isophorone, methyl hexanoate or dimethylformamide, the preferred solvents being ketones or ketone-hydrocarbon mixtures. The emulsifying agents may be anionic, cationic or non-ionic in character. Anionic surfactants include alcohol sulfates or sulfonates, alkylarene sulfonates or sulfosuccinates, such as calcium dodecylbenzenesulfonate or sodium dioctyl sulfosuccinate. Cationic surfactants include fatty acid alkyl amine salts and fatty acid alkyl quaternaries, such as laurylamine hydrochloride or lauryldimethylbenzylammonium chloride. Non-ionic emulsifying agents which may be used include ethylene oxide adducts of alkylphenols, fatty alcohols, mercaptans or fatty acids, such as polyethylene glycol esters of stearic acid or polyethylene glycol ethers of palmityl alcohol or of octylphenol having from about 7 to 100 groups. The concentration of the active ingredients may vary from 10 to 80%, but is preferably 25 to 50%, and the concentration of the emulsifying agents is usually 0.5 to 10% by weight, with the remainder of the formulation being the carrier.

Wettable powders are made by incorporating the imidates in a finely-divided solid carrier and a surfactant or blend of surfactants. Solid carriers suitable for this use are found in the classes of naturally-occurring clays, silicates, silicas, carbonates, limes and organic materials. Typical of these are kaolin, fuller's earth, talc, diatomaceous earth, magnesium lime, dolomite, walnut shell flour, tobacco dust and sawdust. Commonly used emulsifying and wetting agents include polyoxyethylated alkylphenols, fatty alcohols, fatty acids and alkylamines, alkylarene sulfonates and dialkyl sulfosuccinates; spreading agents include such materials as glycerol mannitan laurate and a condensate of polyglycerol and oleic acid modified with phthalic anhydride; and dispersing agents include such materials as the sodium salt of the copolymer of maleic anhydride and an olefin, such as diisobutylene, sodium lignin sulfonate and sodium formaldehyde-naphthalene sulfonates.

Typical wettable powders may contain, for example, 10 to 80% of the herbicidal imidates, and it is usually desirable to add from 1 to 10% by weight of the surfactant; the remainder of the formulation being, of course, the carrier.

Dust concentrates are made by compounding the imidates of this invention with inert carriers normally employed for the manufacture of pesticidal dusts for agricultural use, such as talcs, finely particled clays, pyrophyllite, diatomaceous earth, magnesium carbonate, sulfur or botanical flours, such as soybean, wood, wheat, cottonseed and walnut shell. Dust concentrates containing from 20 to 80% of the toxicant are commonly prepared, but as used, the dusts preferably contain 1 to 20% of the active ingredient. Dust concentrates may be conveniently prepared by diluting a wettable powder formulation with the finely particled solid carriers customarily used in pesticidal dusts.

Granular formulations are made by incorporating the imidates of this invention into granular or pelletized forms of agronomically acceptable carriers, such as granular clays, vermiculite, charcoal, ground corn cobs, or bran in a range of sizes from 8 to 60 mesh (U.S. Standard sieve series sizes). Such granular formulations may be made to contain the imidate in from 1 to 50% by weight.

One convenient method for preparing a solid formulation is to impregnate the imidate toxicant onto the solid carrier by means of a volatile solvent, such as acetone. In this manner, adjuvants, such as fertilizers, activators, synergists, adhesives and various surfactants may also be incorporated. Furthermore, pesticides, including insecticides and fungicides, may be used in conjunction with or admixed with the herbicidal agents of this invention.

The imidates of this invention were evaluated in a standard herbicide screening procedure. This method involves planting seeds of representative crops and weeds in soil, allowing the seeds to germinate and when the seedlings are about 2 weeks old, applying thereto the test compound. The phytotoxic responses and state of growth of the test plants are measured about 2 weeks later. The agents are applied at desired rates in pounds per acre, usually in the range of 1 to 20 pounds, and at a standard carrier rate, if as a spray usually about 50 gallons per acre, although higher and lower carrier rates may be used. However, the major factor in determining herbicidal utility is the rate of application.

Monocotyledonous plants in these studies include crabgrass (*Digitaria sanguinalis*), millet (*Setaria italica*), ryegrass (*Lolium multiflorum*), wild oat (*Avena fatua*), sudangrass (*Sorghum sudanensis*), rice (*Oryza sativa*), wheat (*Triticum vulgare*) and barnyard grass (*Echinochloa crusgalli*).

Dicotyledonous plants include wild carrot (*Daucus carota*), mustard (*Brassica kaber*), lambsquarters (*Chenopodium album*), curly dock (*Rumex crispus*), Indian mallow (*Abutilon theophrasti*), pigweed (*Amaranthus retroflexus*), soybean (*Soja max*), flax (*Linum usitatissimum*), tomato (*Lycopersicum esculentum*) and Lespedeza (*Lespedeza setaria*).

Results are given in Table II for typical monocotyledonous weeds and in Table III for typical dicotyledonous weeds.

TABLE II.—PERCENT PHYTOTOXICITY ON MONOCOTYLEDONOUS PLANTS

| Compound of example | Lbs./acre | Crabgrass | Millet | Wheat | Ryegrass | Wild oat | Sudangrass | Barnyardgrass | Rice | Average |
|---|---|---|---|---|---|---|---|---|---|---|
| 1 | 4 | 90 | 90 | 80 | 70 | 70 | 80 | 60 | 30 | 71 |
|   | 1 | 40 | 50 | 30 | 40 | 20 | 60 | 20 | 0 | 32 |
|   | 2 | 100 | 80 | 50 | 50 | 70 | 60 | 100 | 0 | 63 |
| 2 | 3 | 100 | 100 | 100 | 90 | 100 | 100 | 100 | 40 | 91 |
| 3 | 3 | 60 | 60 | 30 | 40 | 70 | 30 | | | 41 |
| 4 | 3 | 0 | 0 | 10 | 30 | 0 | 0 | | 0 | 5 |
| 5 | 3 | 100 | 100 | 100 | 90 | 99 | 50 | | 50 | 86 |
| 6 | 3 | 40 | 20 | 50 | 10 | 10 | 10 | | | 23 |
| 7 | 3 | 70 | 100 | 90 | 90 | 100 | 50 | | 60 | 82 |
| 8 | 3 | 0 | 10 | 10 | 40 | 0 | 0 | | 10 | 9 |
| 9 | 3 | 30 | 20 | 20 | 0 | 0 | 0 | | 0 | 9 |
| 10 | 3 | 40 | 30 | 30 | 30 | 0 | 0 | | 0 | 20 |
| 11 | 3 | 80 | 30 | 30 | 30 | 0 | 0 | | 30 | 25 |
| 12 | 3 | 100 | 100 | 100 | 99 | 100 | 95 | | 30 | 90 |
| 13 | 3 | 0 | 0 | 0 | 0 | 0 | 0 | | 0 | 0 |

TABLE III.—PERCENT PHYTOTOXICITY ON DICOTYLEDONOUS PLANTS

| Compound of example | Lbs./acre | Mustard | Wild carrot | Lambs-quarters | Curly dock | Indian mallow | Pigweed | Soybean | Flax | Lespedeza | Tomato | Average |
|---|---|---|---|---|---|---|---|---|---|---|---|---|
| 1 | 4 | 100 | 95 | 100 | 100 | 100 | 100 | 100 | 40 | 100 | 20 | 85 |
|   | 1 | 40 | 40 | 70 | 60 | 90 | 70 | 60 | 20 | 100 | 10 | 56 |
|   | 2 | 100 | 50 | 100 | 100 | 100 | 100 | 80 | 30 | | 20 | 78 |
| 2 | 3 | 100 | 100 | 100 | 100 | 100 | 100 | 100 | 100 | | 100 | 100 |
| 3 | 3 | 100 | 0 | | 100 | 100 | 100 | 20 | 70 | 90 | 20 | 70 |
| 4 | 3 | 20 | 0 | | 40 | 80 | 50 | 30 | 0 | 20 | 40 | 31 |
| 5 | 3 | 100 | 0 | 100 | 100 | 99 | 100 | 40 | 100 | | 100 | 82 |
| 6 | 3 | 90 | 0 | 70 | 70 | 60 | 50 | 40 | 20 | | | 50 |
| 7 | 3 | 100 | 0 | | 80 | 100 | 100 | 70 | 95 | 100 | 100 | 83 |
| 8 | 3 | 20 | 20 | | 0 | 10 | 30 | 10 | 0 | 20 | 20 | 14 |
| 9 | 3 | 40 | 0 | | 40 | 60 | 40 | 30 | 30 | 20 | 20 | 31 |
| 10 | 3 | 60 | 0 | | 70 | 50 | 70 | 30 | 30 | 80 | 30 | 47 |
| 11 | 3 | 40 | 0 | | 90 | 50 | 70 | 30 | 20 | 100 | 70 | 52 |
| 12 | 3 | 100 | 0 | 100 | 100 | 100 | 100 | 50 | 100 | | 100 | 83 |
| 13 | 3 | 100 | 0 | 100 | 70 | 50 | 90 | 0 | 0 | | 0 | 46 |

I claim:

1. A compound of the formula

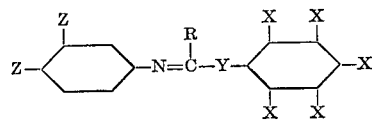

wherein:

R is alkyl of 1 to 6 carbon atoms,
Z is methyl or chloro,
Y is oxygen or sulfur and
X is either hydrogen, alkyl of 1 to 5 carbon atoms, alkoxy of 1 to 5 carbon atoms, chloro or nitro, in which any two or more members represented by X may be the same or different.

2. Phenyl N-(3,4-dichlorophenyl)propionimidate.

3. 4-methoxyphenyl N-(3,4-dichlorophenyl)propionimidate.

4. A compound according to claim 1 wherein Y is oxygen.

5. A compound according to claim 4 wherein Z is chloro.

6. A compound according to claim 5 wherein X is hydrogen.

7. A compound according to claim 1 wherein Y is sulfur.

8. A compound according to claim 1 wherein Z is methyl.

9. A compound according to claim 1 wherein Z is chloro.

10. A compound according to claim 1 wherein X is hydrogen.

References Cited

UNITED STATES PATENTS 2,909,553   10/1959   Stephens _____ 760—453

ROBERT V. HINES, *Primary Examiner.*

U.S. Cl. X.R.

71—98, 121; 260—562, 567.5, 578, 621